Jan. 15, 1935.
E. B. SPEAR ET AL
1,987,643
MANUFACTURE OF CARBON BLACK
Original Filed Aug. 16, 1928   2 Sheets-Sheet 1
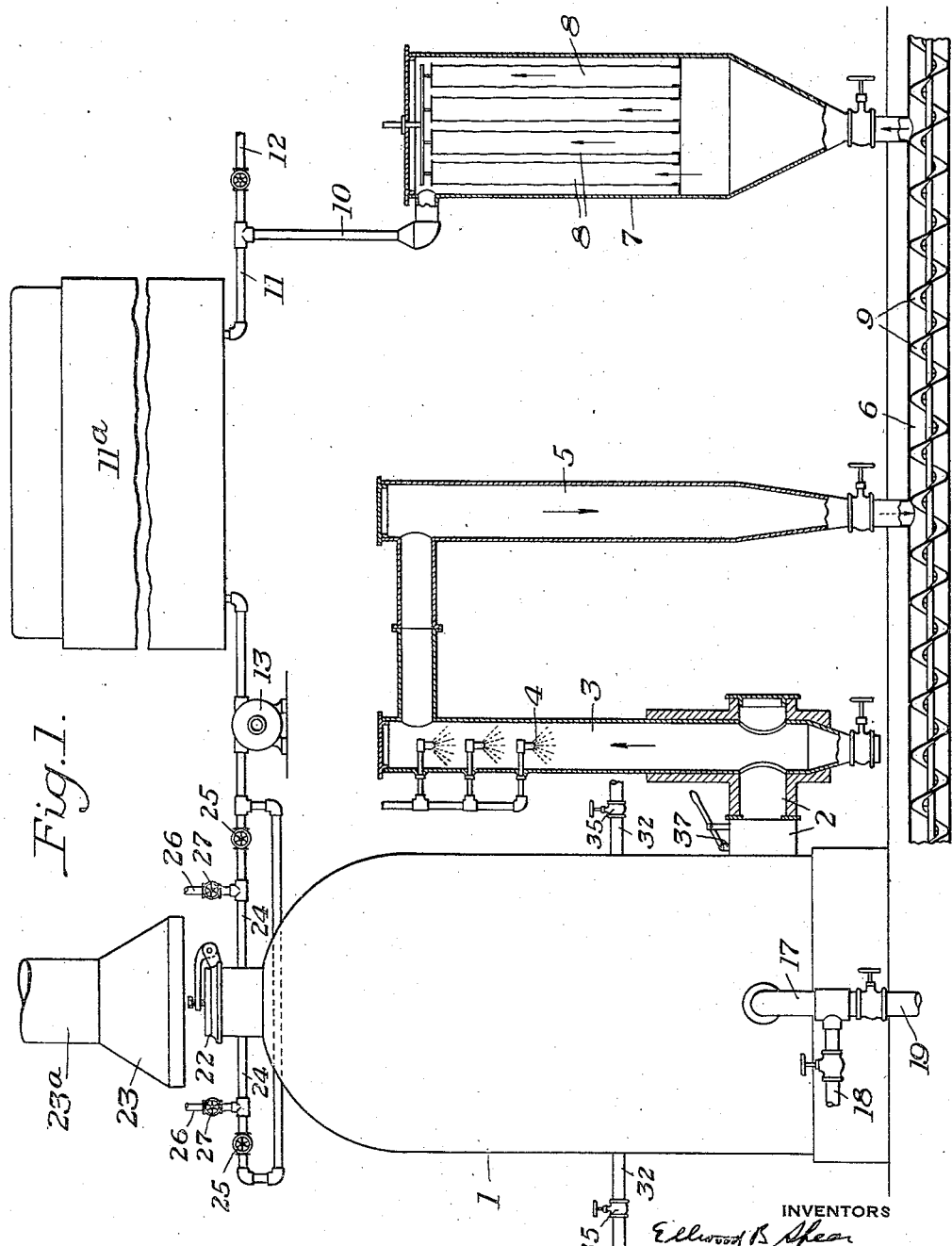
Fig.1.

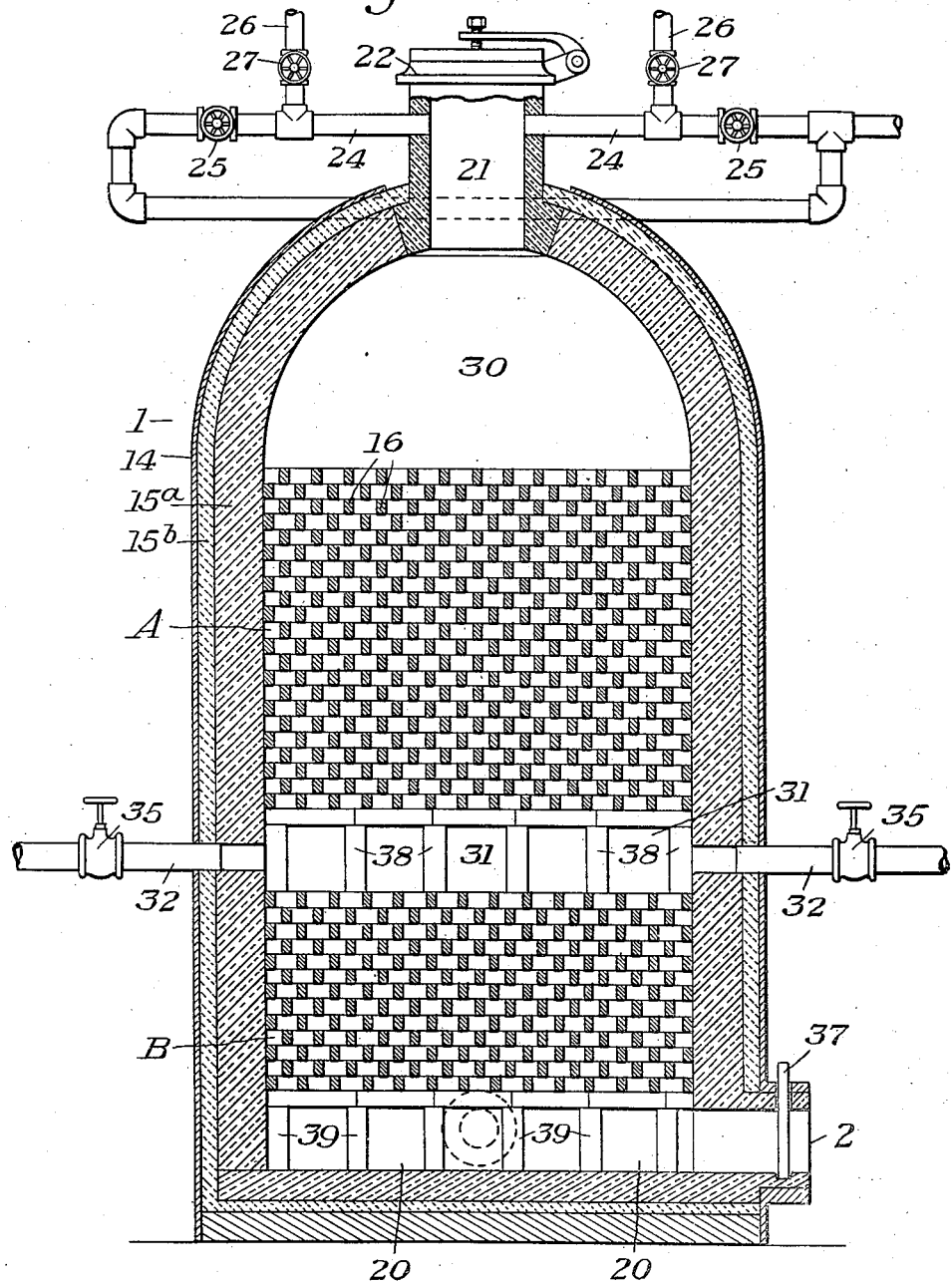

Patented Jan. 15, 1935

1,987,643

UNITED STATES PATENT OFFICE 1,987,643

MANUFACTURE OF CARBON BLACK

Ellwood B. Spear, Milford, N. H., and Robert L. Moore, Mount Lebanon, Pa., assignors, by mesne assignments, to Thermatomic Carbon Company, New York, N. Y., a corporation of Delaware Application August 16, 1928, Serial No. 300,132
Renewed January 7, 1933

16 Claims. (Cl. 134—60)

This application is a continuation in part of our U. S. Patent No. 1,911,003, granted May 23, 1933, and Serial No. 206,500 filed July 18, 1927, now abandoned, and which related to the carbon black of the present application and the method of producing same which comprised passing the mixture of hydrocarbons and inert diluent gases through highly heated refractory checkerwork.

The present invention relates to manufacture of carbon black. The carbon black produced in accordance with the present invention is a variation and an improvement in carbon blacks of the so-called "Thermatomic" type. The "Thermatomic" carbons differ from the common commercial carbon blacks in having markedly less rubber stiffening qualities. The common commercial carbon blacks are ordinarily made by gas flames burning against cool metal surfaces upon which the carbon black is deposited and from which it is scraped. This process is commonly called the "channel" process and these blacks are sometimes called "channel" blacks. The carbon blacks of the "Thermatomic" type are usually made by decomposing the gas in a heated retort, as described, for example, in the Brownlee and Uhlinger Patent No. 1,520,115 of December 23, 1924, or by variations of such process, such, for example, as the process hereinafter described.

The characteristics of "Thermatomic" carbon black as made by the Brownlee and Uhlinger process, and particularly its characteristics in rubber compounding, are described in the patent to Roy H. Uhlinger, No. 1,638,421, dated August 9, 1927. These characteristics, and particularly the rubber-stiffening qualities, differ somewhat from those described in the Brownlee and Uhlinger Patent No. 1,478,730, dated December 25, 1923, as it has been found that the carbon black as made commercially by the Brownlee and Uhlinger process has a substantial stiffening effect upon rubber, although such stiffening effect is much less than that of common commercial carbon black and approximates the stiffening qualities of zinc oxide. In said Uhlinger Patent No. 1,638,421, the characteristics of common commercial carbon black and the "Thermatomic" carbon as made by the Brownlee and Uhlinger process are stated in detail and compared, and need not be here repeated.

The new carbon black which is produced in accordance with the present invention differs from both the common commercial carbon black and the Brownlee and Uhlinger carbon black. It has certain of the desirable qualities of both of these carbon blacks and has certain additional qualities. Generally speaking, our new carbon black has the low rubber stiffening qualities of the Brownlee and Uhlinger carbon and the apparent gravity of the common commercial carbon blacks such as are made by the channel process.

It imparts an ultimate tensile strength to rubber approximately equal to that imparted by an equal weight of the best grade of common commercial carbon black. By ultimate tensile strength is meant the tensile strength at point of rupture. It is usually calculated in pounds per square inch on the original cross section of the test piece required to rupture the test piece. It imparts to the rubber a greater elongation at the point of rupture than that imparted by equal weights of either common commercial carbon black or the Brownlee and Uhlinger carbon black. A somewhat greater proportion by weight of our new carbon black may be milled into rubber and the desirable qualities of the rubber composition retained, than is the case with the Brownlee and Uhlinger carbon black.

The rubber composition in which our new carbon black is compounded therefore differs from rubber compositions as heretofore made, either with common commercial carbon blacks or with the Brownlee and Uhlinger carbon black. The carbon black itself as above described has certain desirable characteristics which make it an improvement over the Brownlee and Uhlinger carbon black for certain purposes. These different characteristics are imparted to the black by its process of manufacture as hereinafter described. Our preferred process resembles the Brownlee and Uhlinger process in that the hydrocarbon gas is decomposed in a retort without substantial combustion of the gas. Our process differs, however, from the Brownlee and Uhlinger process in that the hydrocarbon gas is mixed with a diluent gas.

Claims directed to the compounding of our new carbon black with rubber stocks and the rubber composition produced thereby are presented in our U. S. Patent No. 1,794,558, granted March 3, 1931. Claims directed to the new carbon black produced in accordance with our invention are presented in our copending application Serial No. 484,578 filed September 26, 1930 as a division of the present application.

We will now describe in detail the manufacture of our carbon black and its characteristics.

In the drawings,—

Figure 1 is an elevation, taken partly in vertical section, showing more or less diagrammatically the preferred apparatus for carrying out the process; and Figure 2 is a vertical section through the heating retort.

The preferred apparatus as shown is that of the general type shown in the Brownlee and Uhlinger Patent No. 1,520,115. Generally speaking, it consists of a heating retort which contains refractory checkerwork. This checkerwork is heated to a high temperature by a heating blast. The heating blast is periodically cut off and the hydrocarbon gas to be decomposed, usually natural gas, is passed through the heated checkerwork and is decomposed thereby into hydrogen and solid carbon particles. Part of the carbon particles are deposited on the checkerwork and part are swept along with the gas, which passes out through devices for cooling it and filtering out and recovering the entrained carbon.

Referring to the illustrated embodiment of the apparatus, reference numeral 1 indicates the heating retort in which the decomposition of the hydrocarbon gas takes place. The gas which issues from the retort and which contains the entrained carbon particles, passes through the outlet 2 into a chamber 3 into which the water spray 4 is discharged to cool the gas. The gas is highly heated and converts the water into steam, the latent heat of evaporation serving efficiently to rapidly cool the gas. The gas then passes downwardly through a column 5 and along a conveyor passage 6 into the separating chamber 7 where the gas passes through the fabric bags 8 which are shaken from time to time to dislodge the carbon. The carbon from the separator 7 and the tower 5 falls into the conveyor passage 6 where it is pushed along to the right, as viewed in Figure 1, by means of the screw conveyor 9 to a bin (not shown in the drawing), from which it is bagged. The general layout as above described, and particularly the means for cooling the gas and collecting the carbon black, is described in the Brownlee and Uhlinger Patent 1,520,115. The temperature of the cooling chamber 3 is preferably automatically thermostatically controlled as described in the Brownlee and Uhlinger Patent 1,520,115.

The gas from which the entrained carbon particles have been removed goes from the separator 7 into a discharge pipe 10 having two branches 11 and 12. The branch 11 leads back to the retort 1 through a gas storage tank 11ª (shown diagrammatically and greatly reduced in size) and permits the hydrogen gas formed to be recirculated through the retort as the diluent gas, if so desired.

The branch 12 leads off the excess hyrogen which may be utilized for any desired purpose, such as in the manufacture of ammonia, fertilizer, etc., or even for fuel. A blower 13 is provided for forcing the hydrogen gas into the retort.

The retort 1 and the reactions taking place therein will now be described in more detail.

The retort 1 has a steel plate casing 14 and a lining consisting of an inner facing 15ª of firebrick and a layer 15ᵇ of insulation of refractory insulating material, such as asbestos or the porous insulating material sold under the trademark "Silocel", and composed of diatomaceous earth analyzing on ignited bases approximately 93.7% $SiO_2$, 3.7% $Al_2O_3$, 1.3% $Fe_2O_3$, 0.7% CaO, and 0.6% MgO. The chamber within the retort is filled, for the most part, with checkerwork 16 made of refractory brick, usually silica brick.

The checkerwork is divided into two parts or zones; first, the zone A in which the diluent gas is preheated, and second, the zone B or reaction zone in which the hydrocarbon gas is decomposed.

The checkerwork in the retort is periodically heated by a heating blast admitted through the pipe 17 at the base of the retort. A combustible gas, such, for example, as natural gas, is admitted by the branch pipe 18 and air is admitted by the branch pipe 19 to the blast pipe 17 and into the space 20 at the bottom of the retort where the gas burns and the hot products of combustion pass up through the checkerwork to heat it. During the heating blast, the products of combustion are discharged through the opening 21 having a closure valve 22 which is lifted during the heating blast, but which is closed to exclude air from the retort when the hydrocarbon gas is being decomposed. The products of combustion from the heating blast are discharged into a hood 23 and through a stack 23ª through the roof of the building.

After the checkerwork 16 has been heated, the diluent gas is admitted at the top of the retort through the inlet pipes 24. It is preferred to use as the diluent gas, the gaseous products of decomposition resulting from the process after the entrained carbon has been separated. This gas consists principally of hydrogen, although it may contain a small amount of undecomposed hydrocarbon gas. The hydrogen gas is inert in the process, that is to say, it merely acts as a vehicular diluent and does not chemically react with the hydrocarbon gas being decomposed. This hydrogen gas is admitted to the inlet pipes 24 through the valves 25 from the gas tank 11ª.

The diluent gas passes into the open diffusing chamber 30 in the top of the retort and down through the heated checkerwork zone A to the mixing chamber 31 where it meets the hydrocarbon gas to be decomposed which is introduced through the pipes 32. The hydrocarbon gas to be decomposed is usually referred to as the "run" gas in this industry. There are preferably a plurality of the gas admission pipes 32 so as to insure a thorough mixing in the chamber 31 of the hydrocarbon gas and the diluent gas. The mixed hydrocarbon gas and diluent gas then passes down through the checkerwork reaction zone B in which the hydrocarbon gas is decomposed into hydrogen and solid particles. Part of the carbon is deposited upon the checkerwork brick, but part of it is swept along through the spaces between the checkerwork brick into the chamber 20 at the bottom of the retort and out with the effluent gas through the discharge passage 2 into the carbon-separating apparatus.

The discharge passage 2 is provided with a valve 37 which is closed during the time that the retort is being heated by the heating blast from the burner pipe 17. As shown in the drawings, the checkerwork of the zone A is spaced from the checkerwork of the zone B by supporting columns 38 so as to form a relatively unobstructed chamber 31 in which the hydrocarbon gas discharged inwardly from the plurality of inlets 32 may be quickly and thoroughly mixed with the downwardly flowing current of diluent gas. The checkerwork of zone B is likewise supported on columns 39 to leave a relatively unobstructed space 20 at the bottom of the retort.

A branch pipe 26 controlled by a valve 27 is shown at the top of the retort. This branch pipe is not normally used, but may be used in a modification of the process referred to later in this specification to admit hydrocarbon gas to the top of the retort.

The preferred operation of the apparatus is as follows:

The checkerwork is first heated by applying a heating blast through the burner pipe 17. During this heating blast the valves 25, 35 and 37 are all closed to shut off the retort from the gas admission supplies and from the carbon-collecting portion of the apparatus. The valves in the pipes 18 and 19 are open to admit a combustible mixture of gas and air through the burner pipe 17. The valve 22 is open wide to allow the gases of combustion to pass off into the stack. The heating blast is maintained until the checkerwork is heated to the desired temperature. The checkerwork in the zone B is heated to a preferred temperature of about 1200 to 1400° C. The lower portion of the checkerwork in zone A is heated to about this temperature, although the upper portion of the zone A need not be heated quite as high. An excess of air is supplied to the heating blast so that it has an oxidizing effect to clean the checkerwork by burning off the carbon deposited thereon. The combustion of this carbon of course furnishes heat.

After the checkerwork has been heated sufficiently, the blast is shut off and the cap valve 22 is closed, the outlet valve 37 is opened, the valves 25 are opened to admit the diluent gas at the top of the retort, and the valves 35 are opened to admit the hydrocarbon or run gas into the mixing chamber 31. The diluent gas flowing down through the heating zone A is highly preheated to a temperature well above the decomposition temperature of the hydrocarbon gas. The volume of the diluent gas is preferably in excess of that of the hydrocarbon gas, so that the sensible heat of the inert diluent gas immediately raises the temperature of the hydrocarbon gas in the mixing chamber 31 above the decomposition point. This mixture then passes rapidly down through the heated checkerwork reaction zone B in which the decomposition of the hydrocarbon gas takes place. The hydrocarbon gas is decomposed wholly or nearly completely into hydrogen and solid carbon particles. Part of the carbon becomes deposited on the checkerwork, while the remainder of it is swept along by the effluent gas through the outlet 2 and is recovered. It may be seen that while the absolute velocity of gas flow should be sufficient to sweep the carbon particles from the checkerwork surfaces, the relative or "space" velocity should be sufficiently low to insure substantially complete reaction while in contact with the high temperature heat exchanging surfaces.

The decomposition of the hydrocarbon gas into hydrogen and carbon particles is apparently a surface phenomenon. The decomposition apparently takes place, or takes place initially, at the highly heated surfaces of the refractory checkerwork, and the carbon particles so formed are partly lodged upon the checkerwork and are partly swept along and entrained in the stream of gas.

In order to secure an adequate yield of carbon, the zone in which the hydrocarbon gas is decomposed should contain extensive high temperature heat exchanging surfaces. In the form of retorts illustrated, such surfaces are provided by the checkerwork. We use the word "checkerwork" as a term of general description and not of limitation, and intend to include under such term materials of any shape, whether in the form of regular brick or not, so placed in the retort chamber as to expose extended surfaces with passages between them to permit the flow of the gas. We use the word "checkerwork" to distinguish such a construction on the one hand from an open chamber in which the only surface presented is that of the chamber walls which is so small that but little decomposition of the hydrocarbon gas would result, and on the other hand from beds of granular material in which the pieces of material and the passages between them are so small that the carbon would be practically all caught in the bed of material and could not be recovered.

Other specific forms of extensive heated contact surfaces may be provided in whole or in part by a heat-resisting metal structure, although we prefer to use refractory bricks such as silica or silicon carbide brick, in a retort like that illustrated, in which the heating blast is periodically applied through the reaction zone.

We have found that for the best results the hydrocarbon gas should be quickly and thoroughly mixed with the preheated diluent gas and then the mixture rapidly swept through the checkerwork reaction zone B. If the hydrocarbon gas is slowly heated, such, for example, as would occur if the diluent gas were unheated or if the hydrocarbon gas were slowly mixed with a preheated diluent gas, objectionable compounds, such as naphthalene, would be formed. The hydrocarbon gas would begin to decompose, but instead of decomposing quickly and entirely into carbon and hydrogen which occurs upon quick heating, the gas would decompose partly into oily intermediate compounds. It is therefore preferred to highly preheat the diluent gas and quickly mix it with the hydrocarbon gas. The high preheating of the diluent gas also allows a minimum of checkerwork to be used in the reaction zone B, and there is therefore less surface in the reaction zone B to catch the carbon than would be the case if the gas were delivered to the zone B at a lower temperature and had to be heated by the zone B. The checkerwork in the zone B can therefore be limited to that practically necessary to furnish a sufficient surface for the surface action in decomposing the gas.

The hydrocarbon gas, which is less in volume than the diluent gas, may or may not be preheated. Ordinarily the volume of the diluent gas is sufficient so that upon mixing in the chamber 31 the temperature of the resultant mixture is well above the decomposition point of the hydrocarbon gas. The gas raised to this temperature is therefore in condition to be immediately decomposed by what is apparently the surface contact action of the extensive high temperature heat exchanging surfaces in the reaction zone B. The volume of diluent gas is preferably in excess of the hydrocarbon gas, the volumes of the gases being computed, of course, at the same temperature for purposes of comparison. The volume of the diluent gas is preferably at least twice that of the hydrocarbon gas. Usually the ratio of volume of diluent gas to hydrocarbon gas is about three or four to one. The volume of diluent gas may be increased above this proportion without materially altering the character of the carbon, but for motives of economy a volume of diluent gas greater than necessary should not be used. We prefer to use a dilution ratio of not over about six volumes of diluent gas to one volume of hydrocarbon gas, although such ratio may be exceeded without spoiling the carbon. We have found that if the volume of diluent gas be reduced below about twice that of the hydrocarbon gas, the carbon will grade off with the reduction in volume of the diluent gas, toward the characteristics of the carbon made by the Brownlee and Uhlinger process in which no diluent gas is used. It will be apparent, therefore, that there will be a gradual graduation of the characteristics of the carbon black, in accordance with the amount of diluent gas used, from the characteristics of the Brownlee and Uhlinger carbon black which are secured when but little diluent gas is used in our process, until the full characteristics of our carbon are developed with a properly increased ratio of diluent gas to the hydrocarbon gas.

The presence of the large volume of diluent gas profoundly modifies the carbon from that produced by the Brownlee and Uhlinger process, or that which would be produced by a process in which but a relatively small amount of diluent gas might be used. When a hydrocarbon gas, such as natural gas, is decomposed in a retort as in the Brownlee and Uhlinger process, a carbon black is produced which is of a grayish cast and which contains a larger proportion of large carbon particles than our carbon black. The same would be true if a relatively small amount of a diluent gas were mixed with the hydrocarbon gas. These large carbon particles apparently persist as such when the carbon is milled into rubber or other media. The carbon particles as initially formed at the contact surfaces in the Brownlee and Uhlinger process are in an environment rich in hydrocarbon and they apparently serve as decomposition centers or nuclei which grow in size due to further decomposition of the hydrocarbon gas.

When the hydrocarbon gas is sufficiently diluted, as in our process, the carbon particles as initially formed upon the contact surfaces are in an environment in which the molecules of the hydrocarbon gas are well dispersed in the diluent so that the carbon particles do not have the same opportunity to grow in size.

The extensive high temperature heat exchanging surfaces afforded by the checkerwork speed up the decomposition of the hydrocarbon gas and allow it to proceed rapidly at a temperature practically obtainable in a retort. If an attempt were made to decompose the hydrocarbon gas by mixing it with a highly preheated diluent gas without extensive heat exchanging surfaces, but little decomposition of the hydrocarbon gas would result within a practicable time. Moreover, a temperature which would be destructive of the ordinary refractories would be required to get any substantial decomposition at all without the contact surface action.

For efficient and rapid decomposition of a hydrocarbon gas into a carbon black having the characteristics of our carbon black, it seems to be necessary that extensive high temperature heat exchanging surfaces be provided to accelerate the decomposition of the hydrocarbon gas, and that the carbon particles so formed be surrounded with a well diluted gaseous mixture which will sweep the carbon particles from the contact surfaces and into the cooling apparatus without allowing them to grow unduly large or change in color.

The diluent gases flowing down through the checkerwork zone A into the mixing chamber 31 can have a temperature no higher than that of the checkerwork. The addition of the hydrocarbon gas to be decomposed lowers the temperature of the gaseous mixture in the mixing chamber 31, which flows through the reaction zone B. This reduction in temperature depends upon the dilution ratio.

Assuming that the gases emerging from the bottom of the checkerwork zone A have a temperature of about 1400° C., and assuming a dilution ratio of one part of the hydrocarbon gas at room temperature to three parts of such diluent gas, a calculation solely based upon the cooling effect of this volume of hydrocarbon gas upon the diluent gas, indicates that the temperature of the mixture would be in the neighborhood of 1050° C. Moreover the reaction whereby the hydrocarbon gas is decomposed into carbon and hydrogen is endothermic, thus further tending to cool the mixture.

At temperatures which are practically obtainable for the mixture, the rate of decomposition of the hydrocarbon gas, without the use of high temperature heat exchanging surfaces, would be entirely too slow for practical operation. Because of the money invested, the decomposing retorts must be worked at a fairly high capacity. Therefore, the stream of gas must flow fairly rapidly through any commercial gas decomposing retort. Moreover, if the carbon once formed remains in the heated retort too long, it tends to become coarse or graphitic in texture and gray in color. It is therefore desirable, both for economy in operation and for attaining the desired product, to speed up the decomposing reaction by the use of extensive high temperature heat exchanging surfaces.

These high temperature heat exchanging surfaces have the dual function of bringing up the mixture formed by the preheated diluent gas and the cold hydrocarbon gas to the proper operating temperature, and supplying heat to maintain the endothermic decomposing reaction for a period of time until it is substantially complete, and of exerting the so-called catalytic or surface action in speeding up the decomposing reaction at the operating temperature.

The diluent gas preferably consists principally of inert gas, and by "inert gas" we mean a gas which will not chemically combine with the hydrocarbon gas or the carbon particles entrained in the gas to any substantial extent, as by combustion. The recirculated effluent gas resulting from the process, and which consists principally of hydrogen, is preferably used as the diluent gas, since it is inert and is readily available as a by-product. Moreover, the effluent gas as it leaves the retort is not entirely decomposed, and while it consists principally of hydrogen, it usually contains a small amount of undecomposed hydrocarbon gas. When this gas is again recirculated as a diluent gas, the residual undecomposed hydrocarbon gas again goes through the retort and is further decomposed, thus giving the maximum recovery from the original hydrocarbon gas. Also, when the excess hydrogen is taken off, as through the branch discharge pipe 12, and utilized as hydrogen, it is advantageous to use the effluent gas as a diluent, since the excess hydrogen taken off through the discharge pipe 12 will not be contaminated by other gases.

However, other gases may be employed as the diluent gas, preferably inert gases, such as nitrogen.

In a modification of our basic process which has been developed by E. B. Spear, one of the present applicants and which has been described in U. S. Patent No. 1,880,512, granted October 4, 1932, the diluent gas consists of the gases of combustion resulting from the combustion of a fuel. According to the preferred Spear process, a hydrocarbon fuel, such as natural gas, is burned with air to produce a diluent gas consisting of nitrogen, steam, and carbon dioxide or carbon monoxide, or a mixture of carbon dioxide and carbon monoxide.

According to the Spear process, the hot gases of combustion are immediately utilized while still retaining their sensible heat as the highly preheated diluent gas with which the hydrocarbon gas is mixed, and the mixture then decomposed by passing it over hot contact surfaces. The Spear modification of our basic process is described and claimed in U. S. Patent No. 1,880,512, granted October 4, 1932.

Therefore, while in the process as originally developed by us, the diluent gas is preferably the inert hydrogen-containing gas resulting from the process, other diluent gases may be employed, such, for example, as in the further development of the dilution process by Spear and described and claimed in his U. S. Patent No. 1,880,512, granted October 4, 1932.

While in the original dilution process as developed by us and described as the preferred practice in this application, the cooled hydrogen-containing diluent gas is piped back and reheated by passing it through highly heated checkerwork, the diluent gas might be otherwise heated before it is mixed with the hydrocarbon gas to be decomposed, as, for example, in the Spear process just referred to, in which the combustion gases are supplied preheated before mixture with the hydrocarbon gas by the heat of combustion.

The hydrocarbon gas to be decomposed is preferably natural gas which can be secured cheaply, particularly from wells which are distant from industrial centers. The natural gas consists principally of methane. However, other hydrocarbon gases may be used, such, for example, as still gas from the petroleum refining industry, casing head gas, a gasified or vaporized oil, gases made from coal, etc.

As above described, the usual preferred procedure is to highly preheat the diluent gas and then quickly and thoroughly mix it with a hydrocarbon gas and pass the resultant mixture rapidly through a hot checkerwork reaction zone. This results in the carbon having the characteristics hereafter more fully described.

The process may be modified and still a carbon having the desirable characteristics produced by mixing the diluent gas and hydrocarbon gas before heating. For example, instead of admitting the hydrocarbon gas through the pipes 32, the hydrocarbon gas may be admitted through the branch pipes 26 into the diluent gas which passes into the top of the retort. The current of cold mixed gas then passes down through the entire column of checkerwork in the retort. This procedure gives, of course, the large volume of diluent gas and maintains the black color and lesser weight per unit volume of the carbon. There is, however, a greater tendency for a lowered production of carbon, since in order to heat up the gases they must be passed through a greater amount of checkerwork than the mixture is passed through when the hydrocarbon gas is mixed with the preheated diluent gas, with the consequently greater chance of the carbon becoming encrusted upon the checkerwork and thus lost.

Having described the process of producing our new carbon black, we will now describe its characteristics with particular reference to those of the usual commercial carbon blacks, such as the channel blacks, on the one hand, and to those of the Brownlee and Uhlinger carbon black on the other hand.

Our new carbon black resembles common commercial carbon black in the following particulars:

(1) It is a very finely divided fluffy black powder consisting of particles or aggregates, or both, a large percentage of which are sub-microscopical in size. The average particle size appears to be the same as that of common commercial carbon black.

(2) It has approximately the same apparent gravity or bulking value, namely, 12 to 20 pounds per cubic foot.

(3) It has the same specific gravity in media, such as oils and rubber, namely, 1.75 to 1.79.

(4) When incorporated into rubber in suitable proportions, the ultimate tensile values of the cured compounded stock are practically the same as those of a rubber stock containing an equal proportion by weight of common commercial carbon black.

(5) The color of our carbon is practically black, as contrasted with the distinct grayish cast of the Brownlee and Uhlinger carbon. Our carbon black, produced under some conditions, has the same jet black appearance of the channel blacks. Under other conditions, a slight tendency toward a grayish black as distinguished from a jet black may be noticed. In degree of blackness, its color is much closer to the channel blacks than it is to the Brownlee and Uhlinger carbon, and therefore in describing our carbon as having a black color, we mean a color which is substantially black as contrasted with the grayish color of the Brownlee and Uhlinger carbon.

Our new carbon differs from common commercial carbon black in the following particulars:

(1) It mills into rubber much more quickly and easily.

(2) Rubber stocks containing our new carbon black in suitable proportions are not nearly so stiff as those containing an equal weight of common commercial carbon black.

(3) Rubber stocks containing our new carbon black have a much greater elongation before rupture than those containing an equal proportion by weight of common commercial carbon black.

(4) Our new carbon black has a much lower oil absorption than common commercial carbon black, the oil absorption number being usually less than 100, and generally being between 40 and 50.

(5) Our new carbon black slightly accelerates the rate of cure of rubber compounds, whereas most common commercial carbon blacks do not accelerate the cure and usually retard it.

(6) Much larger proportions of our new carbon black may be milled into rubber advantageously than is the case with common commercial carbon blacks. The maximum reinforcement of rubber by common commercial carbon black is reached with proportions of approximately twenty volumes of carbon black to one hundred volumes of rubber. (See William B. Wiegand's "The Resilient Energy Criterion", Industrial & Engineering Chemistry, vol. 17, page 623, 1925). The maximum reinforcement is reached with our new carbon black at about thirty volumes of our carbon black to one hundred volumes of rubber. Furthermore, as the proportions of common commercial carbon black are increased over twenty volumes per one hundred volumes of rubber, the desirable properties of the rubber stock fall off very rapidly and the stock becomes too stiff to be useful. On the other hand, as much as forty volumes of our new carbon black may be added to one hundred volumes of rubber without any serious deterioration of the quality. Useful stocks have been made with as much as forty volumes of our new carbon black and thirty-five volumes of our other constituents, a total of seventy-five volumes, to one hundred volumes of rubber, a result quite impossible in the case of common commercial carbon black.

Our new carbon black resembles the Brownlee and Uhlinger carbon as follows:

(1) Our new carbon black has about the same low oil absorption as the Brownlee and Uhlinger carbon, namely, an oil absorption number usually below 100 and generally about 40 or 50, and therefore it increases the viscosity of an oil vehicle approximately the same amount as the Brownlee and Uhlinger carbon black.

(2) Our new carbon black stiffens the rubber mix about the same amount as an equal weight of the Brownlee and Uhlinger carbon, that is to say, our new carbon black stiffens rubber much less than an equal weight of common commercial carbon black and to about the same extent of an equivalent volume of common commercial zinc oxide.

(3) Our new carbon black mills into rubber about as easily and quickly as the Brownlee and Uhlinger carbon black.

(4) Our new carbon black has approximately the same specific gravity as the Brownlee and Uhlinger carbon black in media, such as rubber and oils.

Our new carbon black differs from the Brownlee and Uhlinger carbon black in the following particulars:

(1) Our new carbon black has a black color, whereas the color of the Brownlee and Uhlinger carbon black is a dark gray.

(2) Our new carbon black weighs from 12 to 20 pounds per cubic foot, whereas the Brownlee and Uhlinger carbon black weighs from 25 to 35 pounds per cubic foot.

(3) Our new carbon black imparts an ultimate tensile strength to rubber compounds equivalent to that of similar compounds containing an equal weight of the best varieties of common commercial carbon blacks, whereas similar compounds containing an equal weight of the Brownlee and Uhlinger carbon have a lower ultimate tensile strength.

(4) Rubber compounds containing our new carbon black have a much greater elongation at the point of rupture, a much higher resilient energy at the point of rupture (or proof resilience as termed by Wiegand supra), and a much greater resistance to tear, than similar compounds containing an equal weight of the Brownlee and Uhlinger carbon black.

(5) Much higher proportions of our new carbon black may be advantageously used in rubber compounds than can be employed in the case of the Brownlee and Uhlinger carbon.

The stiffness of rubber as the term is used above and as ordinarily used in this art is measured in terms of the load at a given elongation of a test piece. This is commonly measured by determining the load in pounds per square inch of rubber, calculated on the original cross section of the test piece, that is necessary to stretch the test piece to six times its original length.

The oil absorption is usually measured by the well-known Gardner test in which a pale amber colored commercial raw linseed oil is mixed with the carbon black in such proportions that the mass may be rolled into a ball and begin to smear a clean smooth glass or porcelain surface. The number of cubic centimeters of the oil required to be mixed with 100 grams of carbon black is taken as the oil absorption number.

As can be seen from the foregoing description, our new carbon black is particularly valuable for compounding in rubber stocks.

It may be incorporated in the usual way in which the carbon blacks are incorporated in rubber, namely, by milling the carbon black into the raw rubber. The rubber thus compounded is cured or vulcanized in the usual way. The rubber compositions having our new carbon black incorporated or compounded therein have certain characteristics distinguishing them from rubber compositions compounded with common commercial carbon black or with the Brownlee and Uhlinger carbon black. In referring to the characteristics of rubber compositions containing our new carbon black or rubber compounded with our new carbon black, we intend to refer to the rubber compositions or compounds in their cured state. A rubber composition containing our new carbon black has approximately the same ultimate tensile strength as a rubber composition containing an equal weight of common commercial carbon black, but is not so stiff as a rubber so compounded. Rubber compositions containing our carbon black combine the two desirable characteristics of the ultimate tensile strength imparted by common commercial carbon black and the lessened stiffness imparted by the Brownlee and Uhlinger carbon black. Rubber compositions containing our new carbon black have a greater elongation at point of rupture than rubber compositions containing the same weight of either common commercial carbon black or the Brownlee and Uhlinger carbon black. Rubber compositions containing our new carbon black have higher resilient energy at rupture and a greater resistance to tear than rubber compounded with an equal weight of the Brownlee and Uhlinger carbon black. A rubber composition may contain a much larger proportion of our new carbon black without losing its desirable qualities, than is possible with either the common commercial carbon blacks or the Brownlee and Uhlinger carbon black. Carbon black is very much cheaper than rubber per unit volume, and the resultant product will be made at a lower cost.

While we have described in detail the preferred embodiments of our invention and the preferred process of operation, it is to be understood that the invention is not so limited but may be otherwise embodied and practiced within the scope of the following claims.

We claim:

1. The process of producing carbon black by thermal decomposition, which comprises mixing a hydrocarbon gas to be decomposed with at least twice its volume, volumes being computed at the same temperature, of a diluent gas, passing the mixture over extensive high temperature heat exchanging surfaces so as to decompose the hydrocarbon gas and yield solid carbon particles, and separating the carbon particles from the gaseous decomposition products.

2. The process of producing carbon black by thermal decomposition, which comprises mixing a hydrocarbon gas to be decomposed with at least twice its volume, volumes being computed at the same temperature, of a diluent gas consisting principally of inert gas, passing the mixture over extensive high temperature heat exchanging surfaces so as to decompose the hydrocarbon gas and yield solid carbon particles, and separating the carbon particles from the gaseous decomposition products.

3. The process of producing carbon black by thermal decomposition, which comprises mixing a hydrocarbon gas to be decomposed with at least twice its volume of a diluent gas, passing the mixture over heated checkerwork so as to decompose the hydrocarbon gas and yield solid carbon particles, separating the carbon particles from the gaseous decomposition products, and from time to time applying an oxidizing blast to the contact surfaces so as to burn off any carbon deposited thereon.

4. The process of producing carbon black by thermal decomposition, which comprises mixing a hydrocarbon gas to be decomposed with at least twice its volume, volumes being computed at the same temperature, of a diluent gas consisting principally of inert gas and heated above the decomposition temperature of the hydrocarbon gas, passing the mixture over heated checkerwork surfaces so as to decompose the hydrocarbon gas and yield solid carbon particles, and separating the carbon particles from the gaseous decomposition products.

5. The process of producing carbon black by thermal decomposition, which comprises mixing a hydrocarbon gas to be decomposed with from two to six times its volume of a diluent gas, volumes being computed at the same temperature, passing the mixture over heated checkerwork so as to decompose the hydrocarbon gas and yield solid carbon particles, and separating the carbon particles from the gaseous decomposition products.

6. The process of producing carbon black by thermal decomposition, which comprises mixing a hydrocarbon gas to be decomposed with at least twice its volume, volumes being computed at the same temperature, of a diluent gas consisting principally of the gaseous decomposition products obtained from the decomposition of a previously treated quantity of a hydrocarbon gas and heated above the decomposition temperature of the hydrocarbon gas, passing the mixture over extensive heat exchanging surfaces so as to decompose the hydrocarbon gas and yield solid carbon particles, and separating the carbon particles from the gaseous decomposition products.

7. The process of producing carbon black by thermal decomposition, which comprises mixing a hydrocarbon gas to be decomposed with at least twice its volume, volumes being computed at the same temperature, of a diluent gas, heating the mixture by contact with high temperature heat exchanging surfaces so as to decompose the hydrocarbon gas and yield solid carbon particles, and separating the carbon particles from the gaseous decomposition products.

8. The process of producing carbon black by thermal decomposition, which comprises mixing a hydrocarbon gas to be decomposed with from two to six times its volume of a diluent gas, volumes being computed at the same temperature, heating the mixture by contact with high temperature heat exchanging surfaces so as to decompose the hydrocarbon gas and yield solid carbon particles, and separating the carbon particles from the gaseous decomposition products.

9. The process of producing carbon black by thermal decomposition, which comprises mixing a hydrocarbon gas to be decomposed with more than an equal volume of a diluent gas, heating the mixture to the temperature for substantially complete decomposition of said hydrocarbon gas into solid carbon particles and hydrogen by passing said mixture over extensive high temperature heat exchanging surfaces, and maintaining the mixture in contact with said surfaces at said temperature until the decomposition reaction is substantially complete.

10. The process of producing carbon black by thermal decomposition, which comprises mixing a hydrocarbon gas to be decomposed with more than two volumes of a diluent gas, heating the mixture to the temperature for substantially complete decomposition of said hydrocarbon gas into solid carbon particles and hydrogen by passing said mixture over extensive high temperature heat exchanging surfaces, and maintaining the mixture in contact with said surfaces at said temperature until the decomposition reaction is substantially complete.

11. The process of producing carbon black by thermal decomposition, which comprises mixing a hydrocarbon gas to be decomposed with two to six volumes of a diluent gas, heating the mixture to the temperature for substantially complete decomposition of said hydrocarbon gas into solid carbon particles and hydrogen by passing said mixture over extensive high temperature heat exchanging surfaces, and maintaining the mixture in contact with said surfaces at said temperature until the decomposition reaction is substantially complete.

12. The process of producing carbon black by thermal decomposition, which comprises mixing a hydrocarbon gas to be decomposed with more than an equal volume of a heated diluent gas which is substantially inert under the conditions of the decomposition reaction, heating the mixture to the temperature for substantially complete decomposition of said hydrocarbon gas into solid carbon particles and hydrogen by passing said mixture over extensive high temperature heat exchanging surfaces, and maintaining the mixture in contact with said surfaces at said temperature until the decomposition reaction is substantially complete.

13. The process of producing carbon black by thermal decomposition, which comprises mixing a hydrocarbon gas to be decomposed with more than two volumes of a heated diluent gas which is substantially inert under the conditions of the decomposition reaction, heating the mixture to the temperature for substantially complete decomposition of said hydrocarbon gas into solid carbon particles and hydrogen by passing said mixture over extensive high temperature heat exchanging surfaces, and maintaining the mixture in contact with said surfaces at said temperature until the decomposition reaction is substantially complete.

14. The process of producing carbon black by thermal decomposition, which comprises mixing a hydrocarbon gas to be decomposed with two to six volumes of a heated diluent gas which is substantially inert under the conditions of the decomposition reaction, heating the mixture to the temperature for substantially complete decomposition of said hydrocarbon gas into solid carbon particles and hydrogen by passing said mixture over extensive high temperature heat exchanging surfaces, and maintaining the mixture in contact with said surfaces at said temperature until the decomposition reaction is substantially complete.

15. The process of producing carbon black by thermal decomposition, which comprises mixing a hydrocarbon gas to be decomposed with more than two volumes of a diluent gas which is substantially inert under the conditions of the decomposition reaction, heating the mixture rapidly to the temperature for substantially complete decomposition of said hydrocarbon into solid carbon particles and hydrogen by passing said mixture over heated checkerwork, maintaining the mixture in contact with said checkerwork at said temperature until the decomposition reaction is substantially complete, and then rapidly cooling the mixture and separating the carbon particles from the resultant gaseous mixture.

16. The process of producing carbon black by thermal decomposition, which comprises mixing a hydrocarbon gas to be decomposed with two to six volumes of a diluent gas which is substantially inert under the conditions of the decomposition reaction, heating the mixture rapidly to the temperature for substantially complete decomposition of said hydrocarbon into solid carbon particles and hydrogen by passing said mixture over heated checkerwork, maintaining the mixture in contact with said checkerwork at said temperature until the decomposition reaction is substantially complete, and then rapidly cooling the mixture and separating the carbon particles from the resultant gaseous mixture.

ELLWOOD B. SPEAR.
ROBERT L. MOORE.